(12) United States Patent
Mapari (10) Patent No.: US 11,187,023 B2
(45) Date of Patent: Nov. 30, 2021

(54) PISTON ASSEMBLY FOR AIRCRAFT DOOR

(71) Applicant: Hamilton Sundstrand Corporation, Charlotte, NC (US)

(72) Inventor: Vishwith Vishwanath Mapari, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 68 days.

(21) Appl. No.: 16/797,486

(22) Filed: Feb. 21, 2020

(65) Prior Publication Data

US 2021/0198932 A1    Jul. 1, 2021

(30) Foreign Application Priority Data

Dec. 27, 2019    (IN) .............................. 201911054243

(51) Int. Cl.
*E05F 15/53*    (2015.01)
*B64C 13/40*    (2006.01)

(52) U.S. Cl.
CPC .............. *E05F 15/53* (2015.01); *B64C 13/40* (2013.01); *E05Y 2900/502* (2013.01); *E05Y 2900/531* (2013.01)

(58) Field of Classification Search
CPC .............. E05F 15/53; E05Y 2900/531; E05Y 2900/502; B64C 13/40; F15B 2015/1495
See application file for complete search history.

(56) References Cited

U.S. PATENT DOCUMENTS 2,705,939 A    4/1955  Geyer
2,801,615 A    8/1957  Geyer
3,763,747 A    10/1973 Beichel et al.
4,932,311 A    6/1990  Mibu et al.
10,384,764 B2 *  8/2019  Blanc .................... F15B 13/044
10,793,261 B2 *  10/2020 Fox .......................... B64C 13/50
2007/0048105 A1  3/2007  Baker et al.
(Continued)

FOREIGN PATENT DOCUMENTS

DE    4141460 A1    6/1993
EP    0469253 A1    2/1992

OTHER PUBLICATIONS

European Search Report Issued in European Application No. 20208921. 5-1010 dated May 14, 2021; 9 Pages.

*Primary Examiner* — Justin B Rephann
(74) *Attorney, Agent, or Firm* — Cantor Colburn LLP (57) ABSTRACT

Disclosed is an aircraft piston assembly, having: a piston housing fluid port formed in a piston housing; a piston shaft, disposed within the piston housing, configured for translation in either forward or aft directions when fluid is respectively supplied to or removed from the piston housing; a screw shaft, disposed within the piston housing, that includes a first gear that rotates without translation while the piston shaft translates; and a slider, disposed within the piston housing, that includes a second gear, and that is configured for translation without rotation, wherein: the slider moves between a first position where the first gear and the second gear are separated from one another to allow the piston shaft to translate and a second position where the second gear surrounds the first gear so that the first and second gears are engaged with one another and the piston shaft is prevented from translating.

20 Claims, 4 Drawing Sheets

(56) References Cited

U.S. PATENT DOCUMENTS

| | | | |
|---|---|---|---|
| 2007/0194738 A1* | 8/2007 | Hirai | B64C 13/341 |
| | | | 318/480 |
| 2017/0335916 A1* | 11/2017 | Fox | B64C 13/40 |
| 2018/0135717 A1* | 5/2018 | Fox | B64C 9/02 |
| 2018/0156293 A1* | 6/2018 | Fox | F16F 7/1022 |
| 2019/0219076 A1* | 7/2019 | Landberg | F15B 11/127 |
| 2019/0308719 A1* | 10/2019 | Huynh | B64C 13/40 |
| 2019/0315450 A1 | 10/2019 | Fox et al. | |
| 2020/0070959 A1* | 3/2020 | Huynh | B64C 13/505 |

* cited by examiner

PISTON ASSEMBLY FOR AIRCRAFT DOOR

CROSS-REFERENCE TO RELATED APPLICATIONS

This application claims the benefit of Indian Patent Application No. 201911054243 filed Dec. 27, 2019 the disclosure of which is incorporated herein by reference in its entirety.

BACKGROUND

The embodiments herein relate to aircraft door actuators and more specifically to a piston assembly for an aircraft door.

Power doors for aircraft may be actuated by piston assemblies that operate under hydraulic pressure. Such pistons may fully deploy and retract the doors. Partial opening of the doors may be difficult utilizing known piston assemblies. For example, if hydraulic fluid were to lose pressure, e.g., due to a leakage of hydraulic fluid around warn piston seals, the doors may tend to close despite being actuated to a partially opened position.

BRIEF SUMMARY

Disclosed is a piston assembly for an aircraft, comprising: a piston housing; a piston housing fluid port formed in the piston housing for supplying fluid to and removing fluid from the piston housing; a piston shaft disposed within the piston housing, wherein the piston shaft is configured for translation in either forward or aft directions when fluid is respectively supplied to or removed from the piston housing; a screw shaft disposed within the piston housing, wherein the screw shaft includes a first gear that rotates without translation in either the forward or aft directions while the piston shaft translates in either the forward or aft directions; and a slider disposed within the piston housing, wherein the slider includes a second gear, and wherein the slider is configured for translation in either the forward or aft directions without rotation, wherein: the slider moves between a first position where the first gear and the second gear are separated from one another to allow the piston shaft to translate in the forward direction or the aft direction and a second position where the second gear surrounds the first gear so that the first and second gears are engaged with one another and the piston shaft is prevented from translating in the forward or aft directions.

In addition to one or more of the above disclosed aspects or as an alternate: the first gear is located at a screw shaft aft end; the second gear is located at the slider forward end; and the slider and screw shaft are aligned with one another relative to a piston housing center axis.

In addition to one or more of the above disclosed aspects or as an alternate: a slider outer wall extends from the slider forward end to a slider aft end; the slider defines a slider forward cavity, wherein the slider forward end further defines a slider forward opening into the slider forward cavity; and the slider forward cavity is configured to receive the first gear when the slider is in the first position.

In addition to one or more of the above disclosed aspects or as an alternate: the slider is forward of a piston housing aft end; a stub shaft extends forward from the piston housing aft end to engage the slider, wherein the stub shaft is aligned with the piston housing center axis; the slider defines a slider aft cavity, wherein the slider aft end further defines a slider aft opening that opens into the slider aft cavity; and the slider aft cavity is configured to receive the stub shaft and the slider is configured for translating in either forward or aft directions against the stub shaft.

In addition to one or more of the above disclosed aspects or as an alternate: the slider includes a slider divider wall intermediate the slider forward end and the slider aft end, wherein the slider divider wall separates the slider forward cavity from the slider aft cavity; the slider divider wall defines a slider fluid feed port that is configured to fluidly connect the slider forward cavity and the slider aft cavity; and a first biasing member extends from the piston housing aft end to engage the slider.

In addition to one or more of the above disclosed aspects or as an alternate: the slider fluid feed port includes a flow control valve that is configured for preventing flow under a predetermined pressure from flowing to the slider aft cavity.

In addition to one or more of the above disclosed aspects or as an alternate: the slider divider wall defines a slider fluid return port, and the slider fluid return port is configured to allow fluid to flow out of the slider aft cavity through the slider fluid return port while fluid flows into the slider aft cavity through the slider fluid feed port.

In addition to one or more of the above disclosed aspects or as an alternate the first biasing member is disposed on an exterior side of the stub shaft and engages the slider aft end.

In addition to one or more of the above disclosed aspects or as an alternate: the stub shaft defines a stub shaft cavity; and a second biasing member is seated within the stub shaft cavity, against the piston housing aft end, and wherein the second biasing member extends from the piston housing aft end to engage the slider divider wall.

In addition to one or more of the above disclosed aspects or as an alternate: the first biasing member and the second biasing member are springs.

In addition to one or more of the above disclosed aspects or as an alternate: the slider includes a cavity cap disposed at a forward end of the slider aft cavity, and the cavity cap is configured to fluidly isolate the second biasing member from fluid in the slider aft cavity.

In addition to one or more of the above disclosed aspects or as an alternate: the piston housing defines a piston housing outer wall; and the screw shaft includes a screw shaft aft disk, wherein: an outer diameter of the screw shaft aft disk is supported at the piston housing outer wall so that the screw shaft is configured to rotate without translation in either the forward or aft directions while the piston shaft translates; and the first gear is connected to the screw shaft via an aft side of the screw shaft aft disk.

In addition to one or more of the above disclosed aspects or as an alternate: a bearing supports the screw shaft aft disk at the piston housing outer wall.

In addition to one or more of the above disclosed aspects or as an alternate: a piston shaft forward end extends through a piston housing forward end; and a piston shaft aft end includes a piston shaft aft disk that defines a piston skirt which slides against the piston housing outer wall.

In addition to one or more of the above disclosed aspects or as an alternate: the piston shaft defines a piston shaft outer wall; the piston shaft aft disk defines a screw shaft opening; and the screw shaft extends through the screw shaft opening, into the piston shaft.

In addition to one or more of the above disclosed aspects or as an alternate: a piston housing end cap is disposed at the piston housing forward end; the piston housing end cap defines a piston shaft opening through which the piston shaft extends; and a fluid seal is formed by the piston housing end cap, between the piston housing outer wall and the piston shaft outer wall.

In addition to one or more of the above disclosed aspects or as an alternate: a screw shaft forward disk is disposed at a screw shaft forward end; and the screw shaft forward disk is sized to slide against the piston shaft outer wall and form another fluid seal against the piston shaft outer wall.

In addition to one or more of the above disclosed aspects or as an alternate: the piston housing fluid port is defined in the piston housing outer wall between the screw shaft aft disk and the piston housing aft end.

Further disclosed is an aircraft comprising: a door connected to the aircraft and configured to pivot between an opened position and a closed position; and a piston assembly having one or more of the above disclosed aspects connected to the door and to the aircraft.

Further disclosed is a method of actuating a piston, comprising: supplying fluid to or removing fluid from a piston housing; biasing a slider in the piston housing in a first position from pressure in the piston housing, whereby a first gear at a screw shaft aft end of a screw shaft and a second gear at a slider forward end of the slider are spaced apart from one another, and the screw shaft is allowed to rotate; translating a piston shaft from fluid pressure in the piston housing while the screw shaft is allowed to rotate, wherein the piston shaft is translated in a forward direction in response to supply pressure in the piston housing and translated in an aft direction in response to return pressure in the piston housing; stalling fluid within the piston housing; biasing the slider in the piston housing in a second position from pressure in the piston housing, whereby the first gear and the second gear engage one another, and the screw shaft is prevented from rotating; and securing the piston shaft from translation by engagement with the screw shaft while the screw shaft is in the second position.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
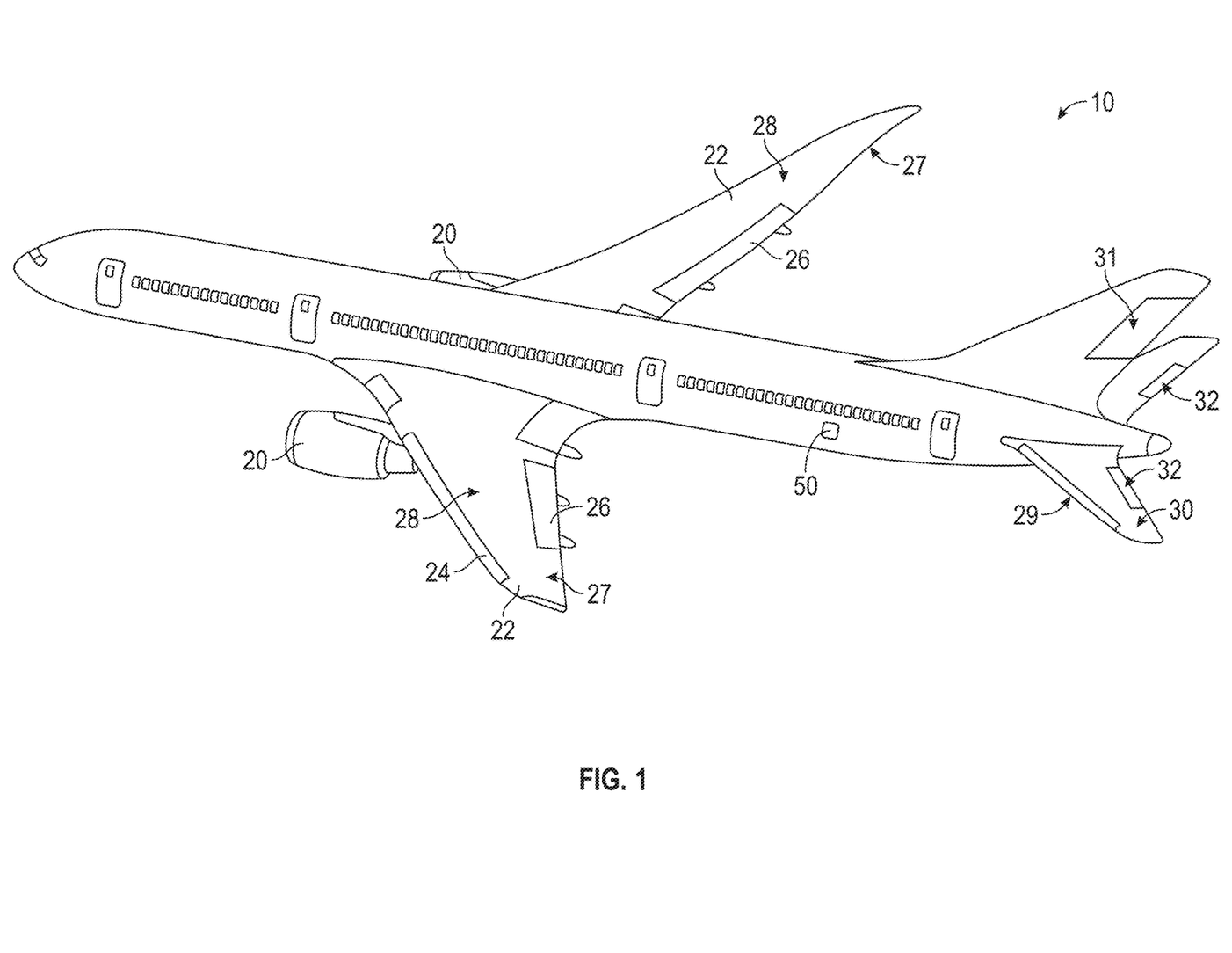
FIG. 1 is a perspective view of an aircraft where embodiments of the present invention can be implemented.

FIG. 1 illustrates an example of a commercial aircraft 10 having aircraft engines surrounded by (or otherwise carried in) a nacelle 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. In addition, the aircraft 10 may include an access door 50 for accessing one or more internal systems. The access door 50 may function on hydraulics, utilizing a hydraulically actuated piston, to deploy and retract the door 50.

As indicated, partial opening or closing of the door may be difficult. For example, if hydraulic fluid were to lose pressure, e.g., due to leakage of hydraulic fluid around warn piston seals, the piston may tend to fully retract the door despite there being an intention to partially open or close the door.

Figure 2:
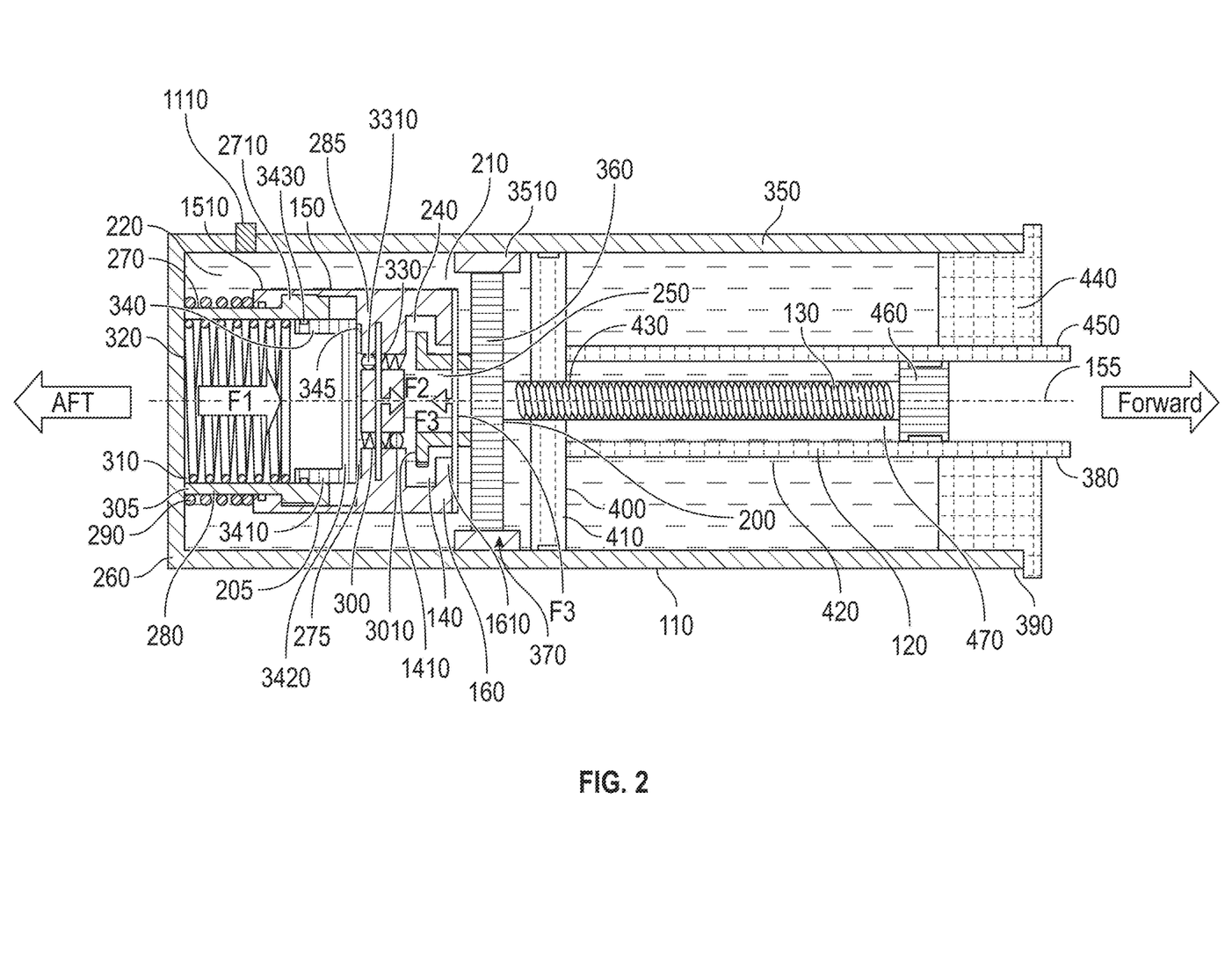
FIG. 2 shows a cross section of a piston assembly utilized for opening and closing the door illustrated in FIG. 1, wherein a slider in the piston assembly is shown in one position.

Turning to FIG. 2, a piston assembly 100 is shown, which may be utilized for opening and closing of the access door 50 (or other door) of the aircraft 10. The piston assembly 100 may include a piston housing 110 that is substantially cylindrical. A piston shaft 120 that is substantially cylindrical may be disposed within the piston housing 110. The piston shaft 120 may be configured for translation in either forward or aft directions when fluid is respectively supplied to or removed from the piston housing 110. That is, translation in the forward direction of the piston shaft 120 deploys the piston shaft 120 from the piston housing 110. Translation in the aft direction of the piston shaft 120 retracts the piston shaft 120 into the housing. As can be appreciated, when the piston shaft 120 is deployed, the access door 50 is opened. When the piston shaft 120 is retracted, the access door 50 is closed. As illustrated, fluid may be supplied to and removed from a piston housing fluid port 1110 of the piston housing 110.

A screw shaft 130 that is substantially cylindrical is disposed within the piston housing 110. The screw shaft 130 includes a first gear 140. The screw shaft 130 is configured to rotate without translation in either the forward or aft directions when the piston shaft 120 translates. That is, for the piston shaft 120 to translate, the screw shaft 130 has to rotate. This is because piston shaft 120 and screw shaft 130 forms a screw-nut pair. A slider 150 that is substantially cylindrical is disposed within the piston housing 110. The slider 150 and screw shaft 130 are aligned with one another relative to a piston housing center axis 155 of the piston housing 150. The slider 150 includes a second gear 160. The slider 150 is configured for translation in either the forward or aft directions without rotation. For example, the slider 150 is configured to be in a first position (FIG. 2) while fluid is being supplied to and removed from piston housing 110. The slider 150 is configured to be in a second position (FIG. 3) when fluid is stalled in the piston housing 110. In one embodiment the first gear 140 and the second gear 160 are dog gears that extend radially toward one another. In one embodiment the first gear 140 and the second gear 160 form a dog gear set. Dog gear sets have fewer and larger teeth which enable the dog gear to fully engage and disengage during rotation of one or both of the dog gear in the set.

Figure 3:
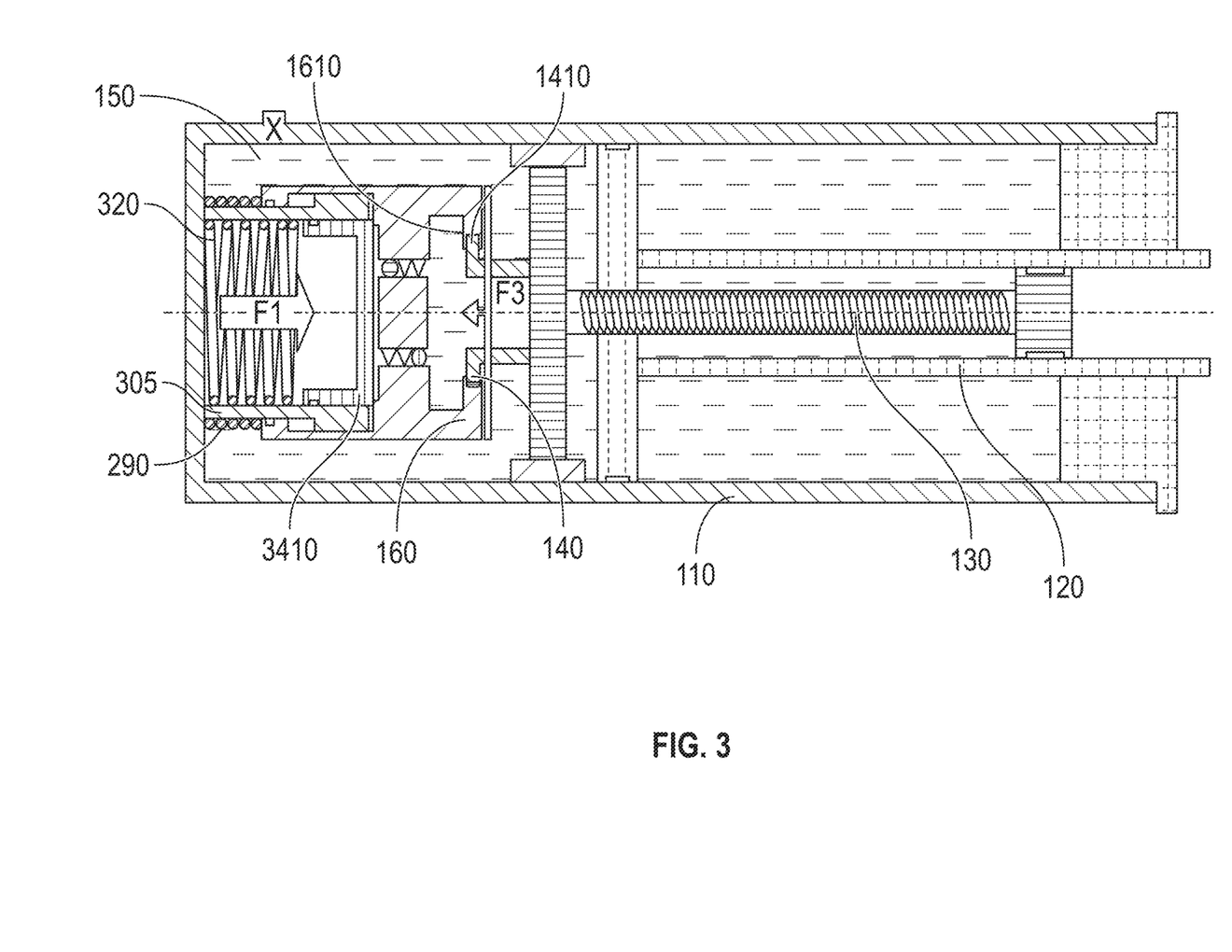
FIG. 3 shows a cross section of the piston assembly of FIG. 2, wherein a slider in the piston assembly is shown in another position.

As discussed in greater detail below, when the slider 150 is in the first position (FIG. 2), the first gear 140 and the second gear 160 are spaced apart from one another along the piston housing center axis 155. When the slider 150 is in the second position (FIG. 3), the first gear 140 and the second gear 160 are aligned with one another relative to the piston housing center axis 155 and are thus capable of engaging with one another. As illustrated in FIG. 3, the second gear 160 surrounds the first gear 140 when first gear teeth 1410 of the first gear 140 and gear teeth 1610 of the second gear engage one another. The slider 150 does not rotate. Thus, engagement of the first and second gears 140, 160 prevents rotation of the screw shaft 130. This prevents relative rotation between the screw shaft 130 and the piston shaft 120, which prevents translation in either the forward or aft directions of the piston shaft 120.

As illustrated in FIG. 2, the slider 150 is disposed aft of the piston shaft 120. The screw shaft 130 includes a screw shaft aft end 200. The screw shaft aft end 200 includes the first gear 140. In addition, the slider 150 includes a slider forward end 210 and a slider aft end 220. The slider forward end 210 includes the second gear 160. When the slider 150 is in the first position (FIG. 2), the gear teeth 1610 of the second gear 160 are forward of the gear teeth 1610 of the first gear 140.

The slider 150 defines a slider outer wall 205 that extends from the slider forward end 210 to the slider aft end 220. Further, the slider 150 defines a slider forward cavity 240. The slider forward end 210 further defines a slider forward opening 250 that opens into the slider forward cavity 240. The slider forward opening 250 may be formed by the second gear 160. When the slider 150 is in the first position (FIG. 2), the first gear teeth 1410 may be within the slider forward cavity 240 such that the slider 150 and the first gear 140 are in a non-contact configuration with respect to one another.

The piston housing 110 includes a piston housing aft end 260. The slider 150 is forward of the piston housing aft end 260. A stub shaft 270 that is substantially cylindrical extends forward from the piston housing aft end 260 to engage the slider 150. The stub shaft 270 is also aligned with the piston housing center axis 155. The slider 150 defines a slider aft cavity 275. The slider aft end 220 further defines a slider aft opening 280 that opens into the slider aft cavity 275. The slider aft cavity 275 is configured to receive the stub shaft 270 such that the slider 150 is configured for translating in either the forward or aft directions against the stub shaft 270.

The slider 150 includes a slider aft end lip 1510 that faces radially inwardly. The stub shaft 270 includes a stub shaft forward end lip 2710 that is faces radially outwardly. The slider aft end lip 1510 and the stub shaft forward end lip 2710 engage one another to prevent the slider 150 from sliding off the stub shaft 270 and to limit a translational range of the slider 150 against the stub shaft 270.

The slider 150 includes a slider divider wall 285 intermediate of the slider forward end 210 and the slider aft end 220. The slider divider wall 285 separates the slider forward cavity 240 from the slider aft cavity 275. The slider divider wall 285 defines a slider fluid feed port 300 that fluidly connects the slider forward cavity 240 and the slider aft cavity 275.

A first biasing member 290 extends from the piston housing aft end 260 to engage the slider 150. The first biasing member 290 may be disposed on an exterior side of the stub shaft 270 and engage the slider aft end 220. The stub shaft 270 may be hollow and define a stub shaft outer wall 305 and a stub shaft cavity 310. A second biasing member 320 may be seated within the stub shaft cavity 310, against the piston housing aft end 260, and may extend from the piston housing aft end 260 toward the slider divider wall 285. According to an embodiment the first and second biasing members 290, 320 are springs.

According to an embodiment the first and second biasing members 290, 320 generate a first biasing force F1 that tends to bias the slider 150 to the first position (FIG. 2). Pressure within the slider aft cavity 275 because of the opened slider fluid port 300, while supplying fluid to the piston housing 110 generates a second biasing force F2, e.g., against an aft side of the slider divider wall 285. The second biasing force F2 also tends to bias the slider to the first position (FIG. 2). On the other hand, fluid pressure generates a third biasing force F3 against, e.g., a forward side of the slider divider wall 285 as well as a forward side of the second gear 160. The third biasing force tends to bias the slider 150 to the second position (FIG. 3).

According to an embodiment the slider divider wall 285 defines a slider fluid return port 330. Fluid flows out of the slider aft cavity 275 through the slider fluid return port 330 while fluid flows into the slider aft cavity 275 through slider fluid feed port 300. According to an embodiment the slider fluid feed port 300 and slider fluid return port 330 may respectively include first and second spring loaded stoppers 3010, 3310, so that each port 300, 330 forms a respective flow control valve. The first spring loaded stopper 3010 in the slider fluid feed port 300 may be configured to allow flow therethrough only when flow pressure is above a predetermined pressure, e.g., at least as great as fluid supply pressure when fluid is supplied into the piston housing 110.

With the utilization of the first and second spring loaded stoppers 3010, 3310, the second biasing force F2 is only generated while fluid is supplied to the piston housing 110, e.g., for the purpose of generating translation in the forward direction of the piston shaft 120. This occurs, e.g., when seeking to open the door 50. That is, the second biasing force F2 is not generated while fluid is removed from the piston housing 110, for the purpose of generating translation in the aft direction of the piston shaft 120. This occurs when seeking to close the door 50. In addition, the second biasing force F2 is not generated when fluid is stalled in the piston housing 110, i.e., when fluid is neither being supplied to nor removed from the piston shaft 120. This occurs, e.g., when seeking to maintain the door 50 in a partially opened or partially closed position.

Regarding the configuration of the slider 150, and the first and second biasing members 290, 320, these components are configured so that while fluid is being supplied to the piston housing 110, the following applies to bias the slider 150 to the first position (FIG. 2):

$F1+F2>F3$(supply).

Here, F3 is the force generated during supply of fluid to the piston housing 110 and deploying the piston shaft 120 from the piston housing 110 by translating the piston shaft 120 in the forward direction. As indicated the slider 150 is biased to the first position (FIG. 2). This configuration spaces the first and second gears 140, 160 from one another along the piston housing center axis 155. This enables rotation of the screw shaft 130 and enables translation in the forward direction of the piston shaft 120, which enables opening of the door 50.

In addition, the slider 150, and the first and second biasing members 290, 320 are configured so that while fluid is being removed from the piston housing 110, F2 is not generated, and the spring forces F1 are greater than F3 to bias the slider 150 to the first position (FIG. 2).

$F1>F3$(return).

Here, F3(return) is the force generated when removing fluid from the piston housing 110 and retracting (returning) the piston shaft 120 into the piston housing 110 by translating the piston shaft 120 in the aft direction. As indicated the slider 150 is biased to the first position (FIG. 2). This configuration spaces the first and second gears 140, 160 from one another along the piston housing center axis 155. This enables rotation of the screw shaft 130, enabling translation in the aft direction of the piston shaft 120. This enables closing of the access door 50 (FIG. 1).

Further, the slider 150, and the first and second biasing members 290, 320 are configured so that when the fluid is stalled in the piston housing 110, i.e., when fluid is neither supplied to nor removed from the piston housing 110, the spring forces F1 are less than the fluid biasing forces to bias the slider 150 to the second position (FIG. 3):

F1<F3(stall).

Here, F3 (stall) is the force generated when pressure in the piston housing 110 reaches the stall pressure for the fluid. As indicated the slider 150 is biased to the second position (FIG. 3). This enables engagement of the first and second gears 140, 160, preventing rotation of the screw shaft 130 and preventing translation of the piston shaft 120. This locks the access door 50 (FIG. 1) in a partially opened or partially closed position.

According to an embodiment, the slider 150 includes a cavity cap 340 disposed at a forward end of the slider aft cavity 275. The cavity cap 340 fluidly isolates the second biasing member 320 from fluid in the slider aft cavity 275. For example, the cavity cap 340 defines a cavity cap outer wall 3410 that is cylindrically shaped and extends aft from a cavity cap forward end 3420. The second biasing member 320 engages the cavity cap outer wall 3410 when biasing the slider 150 to the first position (FIG. 2).

A gap cavity 345 is formed in a gap between the cavity cap forward end 3420 and the slider divider wall 285. The gap cavity 345 is located at a forward end of the slider aft cavity 275. Aft of the slider divider wall 285, fluid fills only the gap cavity 345 when fluid enters the slider aft cavity 275 through the slider fluid feed port 300. This is sufficient to generate the second biasing force F2 against the aft side of the slider divider wall 285 that tends to bias the slider 150 to the first position (FIG. 2).

The cavity cap outer wall 3410 is sized to form a skirt that slides against stub shaft outer wall 305 when the slider 150 translates between the first position (FIG. 2) and the second position (FIG. 3). An o-ring groove 3430 is formed in the cavity cap outer wall 3410 for fitting an o-ring therein to provide a fluid seal that fluidly isolates the second biasing member 320 from fluid in the gap cavity 345. This arrangement of cavity cap 340 restricts the fluid from retaining in the gap cavity 345 while the pressure inside the cylinder is changed from supply to stall.

The piston housing 110 defines a piston housing outer wall 350. The screw shaft 130 includes a screw shaft aft disk 360 connected to the screw shaft aft end 200. The screw shaft aft disk 360 is aft of the piston shaft 120. An outer diameter 370 of the screw shaft aft disk 360 is supported at the piston housing outer wall 350, e.g., by a bearing 3510. With this configuration the screw shaft 130 rotates without translation in either the forward or aft directions when the piston shaft 120 translates. The first gear 140 is connected to the screw shaft 130 via an aft side of the screw shaft aft disk 360. Further, as illustrated, the piston housing fluid port 1110 may be located in the piston housing outer wall 350, between the piston housing aft end 260 and the bearing 3510.

A piston shaft forward end 380 of the piston shaft 120 extends through a piston housing forward end 390 of the piston housing 110. A piston shaft aft end 400 of the piston shaft 120 includes a piston shaft aft disk 410 that defines a piston skirt which slides against the piston housing outer wall 350. The piston shaft aft disk 410 is forward of the screw shaft aft disk 360.

The piston shaft 120 defines a piston shaft outer wall 420. The piston shaft aft disk 410 defines a screw shaft opening 430. The screw shaft 130 extends through the screw shaft opening 430, into the piston shaft 120.

A piston housing end cap 440 is disposed at the piston housing forward end 390. The piston housing end cap 440 defines a piston shaft opening 450 through which the piston shaft 120 extends. The piston housing end cap 440 forms a fluid seal between the piston housing outer wall 350 and the piston shaft outer wall 420.

A screw shaft forward disk 460 is disposed at a screw shaft forward end 470 of the screw shaft 130. The screw shaft forward disk 460 is sized to slide against the piston shaft outer wall 420 and form another fluid seal, i.e., against the piston shaft outer wall 420.

Figure 4:
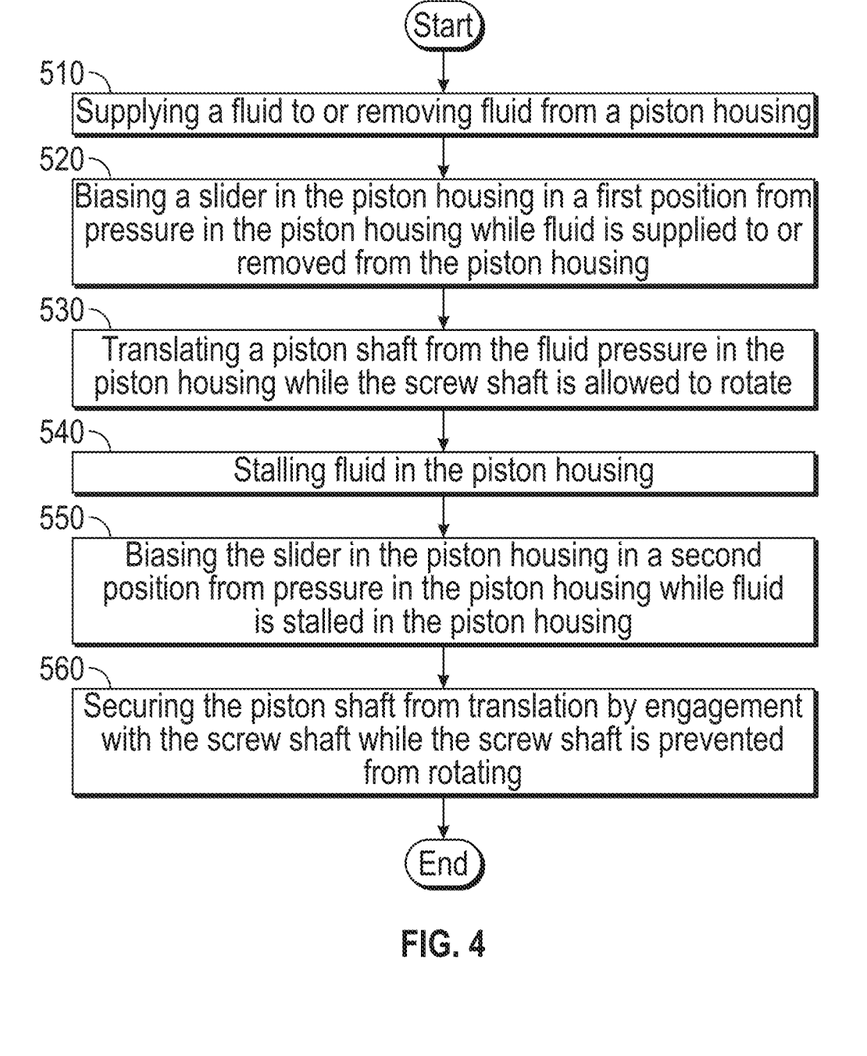
FIG. 4 is a flowchart showing a method of operating the piston assembly of FIG. 2.

Turning to FIG. 4, a flowchart shows a method of operating the piston assembly 100. As shown in block 510 the method includes supplying a fluid to, or removing fluid from, the piston housing 110. As shown in block 520 the method includes biasing the slider 150 in the piston housing 110 in the first position (FIG. 2) from the fluid pressure generated when supplying the fluid to, or removing the fluid from, the piston housing 110. In this position, the first gear 140 at the screw shaft aft end 200 of the screw shaft 130 and the second gear 160 at the slider forward end 210 of the slider 150 are spaced apart from one another along the piston housing center axis 155. From this, the screw shaft 130 is allowed to rotate.

As shown in block 530 the method includes translating the piston shaft 120 from pressure in the piston housing 110 while the screw shaft 130 is allowed to rotate. As indicated the piston shaft 120 is translated in the forward direction in response to supply pressure in the piston housing 110 and translated in the aft direction in response to return pressure in the piston housing 110.

As shown in block 540 the method includes stalling fluid within the piston housing 110. As shown in block 550 the method includes biasing the slider 150 in the piston housing 110 in the second position (FIG. 3) from the fluid pressure while fluid is stalled in the piston housing 110. In this position, the first gear 140 and the second gear 160 are configured to engage one another, and the screw shaft 130 is prevented from rotating. As shown in block 560 the method includes securing the piston shaft 120 from translation by engagement with the screw shaft 130 while the screw shaft 130 is prevented from rotating.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A piston assembly for an aircraft, comprising:
a piston housing;
a piston housing fluid port formed in the piston housing for supplying fluid to and removing fluid from the piston housing;
a piston shaft disposed within the piston housing, wherein the piston shaft is configured for translation in either forward or aft directions when fluid is respectively supplied to or removed from the piston housing;
a screw shaft disposed within the piston housing, wherein the screw shaft includes a first gear that rotates without translation in either the forward or aft directions while the piston shaft translates in either the forward or aft directions; and
a slider disposed within the piston housing, wherein the slider includes a second gear, and wherein the slider is configured for translation in either the forward or aft directions without rotation,
wherein:
the slider moves between a first position where the first gear and the second gear are separated from one another to allow the piston shaft to translate in the forward direction or the aft direction and a second position where the second gear surrounds the first gear so that the first and second gears are engaged with one another and the piston shaft is prevented from translating in the forward or aft directions.

2. The piston assembly of claim 1, wherein:
the first gear is located at a screw shaft aft end;
the second gear is located at a slider forward end; and
the slider and screw shaft are aligned with one another relative to a piston housing center axis.

3. The piston assembly of claim 2, wherein:
a slider outer wall extends from the slider forward end to a slider aft end;
the slider defines a slider forward cavity, wherein the slider forward end further defines a slider forward opening into the slider forward cavity; and
the slider forward cavity is configured to receive the first gear when the slider is in the first position.

4. The piston assembly of claim 3, wherein:
the slider is forward of a piston housing aft end;
a stub shaft extends forward from the piston housing aft end to engage the slider, wherein the stub shaft is aligned with the piston housing center axis;
the slider defines a slider aft cavity, wherein the slider aft end further defines a slider aft opening that opens into the slider aft cavity; and
the slider aft cavity is configured to receive the stub shaft and the slider is configured for translating in either forward or aft directions against the stub shaft.

5. The piston assembly of claim 4, wherein:
the slider includes a slider divider wall intermediate the slider forward end and the slider aft end, wherein the slider divider wall separates the slider forward cavity from the slider aft cavity;
the slider divider wall defines a slider fluid feed port that is configured to fluidly connect the slider forward cavity and the slider aft cavity; and
a first biasing member extends from the piston housing aft end to engage the slider.

6. The piston assembly of claim 5, wherein:
the slider fluid feed port includes a flow control valve that is configured for preventing flow under a predetermined pressure from flowing to the slider aft cavity.

7. The piston assembly of claim 6, wherein:
the slider divider wall defines a slider fluid return port, and
the slider fluid return port is configured to allow fluid to flow out of the slider aft cavity through the slider fluid return port while fluid flows into the slider aft cavity through the slider fluid feed port.

8. The piston assembly of claim 6, wherein the first biasing member is disposed on an exterior side of the stub shaft and engages the slider aft end.

9. The piston assembly of claim 8, wherein:
the stub shaft defines a stub shaft cavity; and
a second biasing member is seated within the stub shaft cavity, against the piston housing aft end, and wherein the second biasing member extends from the piston housing aft end to engage the slider divider wall.

10. The piston assembly of claim 9, wherein:
the first biasing member and the second biasing member are springs.

11. The piston assembly of claim 9, wherein:
the slider includes a cavity cap disposed at a forward end of the slider aft cavity, and
the cavity cap is configured to fluidly isolate the second biasing member from fluid in the slider aft cavity.

12. The piston assembly of claim 8, wherein:
the piston housing defines a piston housing outer wall; and
the screw shaft includes a screw shaft aft disk,
wherein:
an outer diameter of the screw shaft aft disk is supported at the piston housing outer wall so that the screw shaft is configured to rotate without translation in either the forward or aft directions while the piston shaft translates; and
the first gear is connected to the screw shaft via an aft side of the screw shaft aft disk.

13. The piston assembly of claim 12, wherein:
a bearing supports the screw shaft aft disk at the piston housing outer wall.

14. The piston assembly of claim 12, wherein:
a piston shaft forward end extends through a piston housing forward end; and
a piston shaft aft end includes a piston shaft aft disk that defines a piston skirt which slides against the piston housing outer wall.

15. The piston assembly of claim 14, wherein:
the piston shaft defines a piston shaft outer wall;
the piston shaft aft disk defines a screw shaft opening; and
the screw shaft extends through the screw shaft opening, into the piston shaft.

16. The piston assembly of claim 15, wherein:
a piston housing end cap is disposed at the piston housing forward end;
the piston housing end cap defines a piston shaft opening through which the piston shaft extends; and
a fluid seal is formed by the piston housing end cap, between the piston housing outer wall and the piston shaft outer wall.

17. The piston assembly of claim 16, wherein:
a screw shaft forward disk is disposed at a screw shaft forward end; and
the screw shaft forward disk is sized to slide against the piston shaft outer wall and form another fluid seal against the piston shaft outer wall.

18. The piston assembly of claim 12, wherein:
the piston housing fluid port is defined in the piston housing outer wall between the screw shaft aft disk and the piston housing aft end.

19. An aircraft comprising:
a door connected to the aircraft and configured to pivot between an opened position and a closed position; and
the piston assembly of claim 1 connected to the door and to the aircraft.

20. A method of actuating a piston, comprising:
supplying fluid to or removing fluid from a piston housing;
biasing a slider in the piston housing in a first position from pressure in the piston housing, whereby a first gear at a screw shaft aft end of a screw shaft and a second gear at a slider forward end of the slider are spaced apart from one another, and the screw shaft is allowed to rotate;
translating a piston shaft from fluid pressure in the piston housing while the screw shaft is allowed to rotate, wherein the piston shaft is translated in a forward direction in response to supply pressure in the piston housing and translated in an aft direction in response to return pressure in the piston housing;
stalling fluid within the piston housing;
biasing the slider in the piston housing in a second position from pressure in the piston housing, whereby the first gear and the second gear engage one another, and the screw shaft is prevented from rotating; and
securing the piston shaft from translation by engagement with the screw shaft while the screw shaft is in the second position.

* * * * *